(12) United States Patent
Van Lunteren et al.

(10) Patent No.: US 7,193,997 B2
(45) Date of Patent: Mar. 20, 2007

(54) PACKET CLASSIFICATION

(75) Inventors: Jan Van Lunteren, Adliswil (CH); Antonius Engbersen, Feusisberg (CH)

(73) Assignee: International Business Machines Corporation, Armonk, NY (US)

(*) Notice: Subject to any disclaimer, the term of this patent is extended or adjusted under 35 U.S.C. 154(b) by 1171 days.

(21) Appl. No.: 10/090,592

(22) Filed: Feb. 28, 2002

(65) Prior Publication Data
US 2002/0191605 A1 Dec. 19, 2002

(30) Foreign Application Priority Data
Mar. 19, 2001 (EP) .................................. 01810265

(51) Int. Cl.
*H04L 12/28* (2006.01)
(52) U.S. Cl. .................... 370/392; 370/401; 711/108
(58) Field of Classification Search ................ 370/392, 370/401; 711/108
See application file for complete search history.

(56) References Cited

U.S. PATENT DOCUMENTS

| 5,938,736 A * | 8/1999 | Muller et al. ............... 709/243 |
| 6,415,354 B1 * | 7/2002 | Joffe et al. .................. 711/108 |
| 2002/0126672 A1 * | 9/2002 | Chow et al. ................. 370/392 |

* cited by examiner

*Primary Examiner*—Wellington Chin
*Assistant Examiner*—Steven A Blount
(74) *Attorney, Agent, or Firm*—Douglas W. Camron; Anne V. Dougherty

(57) ABSTRACT

Methods and apparatus are provided for classifying data packets in data processing systems. A first packet classification method determines which of a plurality of predefined processing rules applies to a data packet, where each rule is associated with a range of possible data values in each of a plurality of dimensions (X,Y) corresponding to respective data items in the packet format. For each dimension (X,Y), it is determined which of a set of predefined basic ranges contains the corresponding data value ($I_1$, $I_2$) from the packet, where the basic ranges correspond to respective non-overlapping value ranges between successive rule range boundaries in the dimension. For the basic range so determined for each dimension, a corresponding basic range identifier is selected from a set of predefined basic range identifiers corresponding to respective basic ranges in that dimension. For each of at least two dimensions (X,Y), the basic range identifiers comprise respective $p_D$-bit strings generated independently for that dimension by a process of deriving a primitive range hierarchy based on the rule ranges in that dimension. The resulting basic range identifiers, one for each dimension, are then combined to produce a search key which is supplied to a ternary content-addressable memory (5). In the memory (5), the search key is compared with a set of ternary rule vectors, each associated with a particular rule and derived for that rule from the aforementioned hierarchies, to identify at least one rule which applies to the data packet. A second method classifies data packets according to the values in respective data packets of a single, predetermined data item (DA) in the data packet format, where a plurality of classification results are predefined for respective ranges of values of the data item (DA). Here the data item (DA) in the packet is first segmented. The resulting segments are then equated to different dimensions (X,Y) of a multidimensional packet classification problem and are processed in a similar manner to identify a classification result for the packet.

24 Claims, 8 Drawing Sheets

| Basic Range | Basic Range ID | Basic Range | Basic Range ID |
|---|---|---|---|
| X0 | 00000 | Y0 | 00000 |
| X1 | 11000 | Y1 | 01000 |
| X2 | 01100 | Y2 | 01010 |
| X3 | 01000 | Y3 | 01011 |
| X4 | 01010 | Y4 | 01100 |
| X5 | 01011 | Y5 | 10010 |
| X6 | 10010 | Y6 | 10000 |
| X7 | 10000 | Y7 | 00000 |
| X8 | 00000 | | |

| Entry | Rule Vector | Rule ID |
|---|---|---|
| 1 | 1001X0101X | rule 4 |
| 2 | 010110101X | rule 4 |
| 3 | 0110X1001X | rule 3 |
| 4 | 0110X0110X | rule 3 |
| 5 | 11XXX1001X | rule 3 |
| 6 | 11XXX0110X | rule 3 |
| 7 | 10XXX0110X | rule 2 |
| 8 | 10XXX01011 | rule 2 |
| 9 | 10XXX10XXX | rule 2 |
| 10 | 0101X0110X | rule 2 |
| 11 | 0101X01011 | rule 2 |
| 12 | 0101X10XXX | rule 2 |
| 13 | 01XXX01XXX | rule 1 |

| Rule Vector | Rule ID |
|---|---|
| X1111X | rule 4 |
| X011X1 | rule 3 |
| X1X1XX | rule 2 |
| 1XXX1X | rule 1 |

PACKET CLASSIFICATION

TECHNICAL FIELD

This invention relates generally to classification of data packets in data processing devices.

DESCRIPTION OF PRIOR ART

Classification of data packets is typically performed by devices in data processing systems, in particular data communications networks, to determine how each packet should be handled by the processing device. For example, to implement network services such as routing, differentiated QoS (Quality-of-Service), firewall access control, traffic shaping etc., various packet "flows" are defined. A flow is essentially a set of packets to which a specified handling policy, or "rule", applies. Such rules may specify, for example, whether a packet should be forwarded or filtered, where it should be forwarded to, the priority or class of service to be applied to the packet, and the amount to be charged for the transmission. The particular flow to which a packet belongs, and hence the processing rule to be applied to the packet, is determined from the values of various data items in the packet, typically some combination of values in the packet header such as the source IP (Internet Protocol) address, destination IP address, source and destination port numbers, protocol etc., as specified in the header fields. By way of example, a rule might specify that all packets from particular source addresses to particular destination addresses should be forwarded with highest priority, or, in a firewall for example, should be denied access. For each data item in the packet format which must be evaluated to determine applicability of a given rule, the rule specifies an associated range of data values, where in general this range (referred to herein as the "rule range") may consist of a single value or a series of values for the data item in question. (More than one rule range for a particular data item may of course be associated with a given rule in some cases). The rule ranges themselves may be expressed in various ways, for example by the first and last values in a series, or by a prefix, or in the case of a single-value rule range by that value itself. In any case, for each rule, an associated rule range is specified for each of the data items to be evaluated, and a packet is identified as belonging to the flow for which the rule applies if the corresponding data item values in the packet are within the specified rule ranges. Where the rules are such that a given packet may satisfy the conditions of more than one rule, then the rules can be prioritized on some basis and the highest priority rule satisfied by the data packet selected as the applicable rule for that packet.

Packet classification as described above is typically performed by each data processing device (such as a switch, router, bridge, brouter etc.) in the path across a network system, be it a network or internetwork, via which the packet is forwarded between its source and destination nodes. Due to the increasing volume of traffic handled by modern network systems, and continuing improvements in network technologies, the fundamental task of packet classification is critical to overall network efficiency. An efficient packet classification system should allow high speed processing of packets for large numbers of rules, while maintaining storage requirements as low as possible. In addition, the system should be easily updatable to add or remove rules in accordance with changing network requirements.

One example of a packet classification system is disclosed in Proc. ACM SIGCOMM'98, Comp. Commun. Rev. Vol. 28, No. 4, October 1998, pp 203–214, "High-Speed Policy-based Packet Forwarding using Efficient Multi-dimensional Range Matching", T. V. Lakshman and D. Stiliadis. Here, in each of a plurality of dimensions (which correspond to respective data items in the packet format, such as source address, destination address etc., for which rule ranges are specified in the rule set), the values spanned by the set of rule ranges in that dimension are partitioned into non-overlapping intervals. These intervals represent the ranges of values between successive boundaries of the rule ranges in the dimension. For each dimension, a bitmap is generated for each of the intervals. Each bitmap has one bit for each rule in the rule set, the bit being set ("1") if the corresponding rule applies in the interval, and unset ("0") if the rule does not apply. The bits in the bitmap are ordered according to the priority order of the rules. To classify a packet, for each dimension the corresponding data value in the packet is mapped to the bitmap of the interval in that dimension which contains the data value. A bitwise AND of the resulting bitmaps, one for each dimension, then indicates which rules apply to the packet by the locations of the set bits in the result, the first set bit indicating the highest priority rule. With this system, for a large rule set the bitmaps become long, requiring a lot of storage, and the bitwise AND function becomes time intensive. Moreover, the data structure is not easily updated to accommodate rule changes since addition of a new rule requires modification of all the bitmaps.

An alternative packet classification system is disclosed in ACM SIGCOMM'99, Comp. Commun. Rev. Vol. 29, No. 4, October 1999, pp 147–160, "Packet Classification on Multiple Fields", P. Gupta and N. McKeown. This system is implemented in a number of sequential phases, each phase consisting of a set of parallel memory lookups. In the first phase the packet header is split into multiple "chunks" that are used to index multiple memories in parallel. In succeeding phases, outputs of the lookup operations in previous phases are combined to produce new chunks which form the inputs for further parallel lookup operations. In a preprocessing step, so-called "chunk equivalence sets" are derived for each chunk, for first phase chunks from the projection of the various rule ranges on each chunk, and for subsequent phases from the possible intersections of the chunk equivalence sets of previous phases. Each chunk equivalence set element is assigned an "equivalence class ID" by binary numbering of the set elements starting at zero. The result of each lookup operation, where a memory is indexed using a chunk value, is the equivalence class ID corresponding to the element of the chunk equivalence set to which the value relates. The memory lookup in the last phase yields the ID of the applicable rule with the highest priority. The disadvantages of this system are its large storage requirements and inefficient storage usage. Depending on the rule characteristics, the same value may appear many times in many memories, and updating the data structure to add or remove a rule can affect many memory locations thus compromising update speed. In addition, the preprocessing operation can be time intensive for large numbers of rules.

Our copending European Patent Application No. 00810073.1, filed 27 Jan. 2000, discloses a packet classification system in which, like the Lakshman and Stiliadis reference above, the values spanned by the rule ranges in the different dimensions are partitioned into intervals (here "basic ranges") which correspond to the non-overlapping value ranges between successive rule range boundaries in each dimension. Here, however, the basic ranges in a given dimension are assigned identifiers ("range tokens") derived by constructing a hierarchy based on the rule ranges. The hierarchy is constructed in a particular manner from "primitive ranges" which correspond to respective portions of the rule ranges between rule range boundaries. The primitive ranges are assigned "primitive range identifiers" according to a certain scheme, and the range tokens are generated from the primitive range identifiers for the primitive ranges intersected by each basic range. For classifying a data packet, the data value in each dimension is mapped to the corresponding range token (i.e. that for the basic range containing the data value in question), and the resulting range tokens are combined to produce a search key. The search key is then used as input to a longest matching prefix search tree. The data structure for this search tree is designed on the basis of "rule prefixes" which, in turn, are derived using the aforementioned primitive range hierarchies. In this system, the construction of the hierarchies is based on a certain ordering of the rules. That is, a specific rule order is defined and the hierarchies in each dimension are then built according to this defined rule order. As a consequence, prior to construction of the hierarchies, certain rules are split according to a particular scheme which enforces the rule order in each dimension. In this system therefore, the process of generating the range tokens for each dimension is dependent on the process for the other dimensions, the resulting range tokens being similarly interdependent in that the range tokens for all dimensions reflect the same rule order.

As discussed in detail below, embodiments of the present invention also employ identifiers for the basic ranges which are derived from primitive range hierarchies, though the scheme employed here differs from that in our earlier application referenced above. Further, embodiments of the invention employ a ternary content-addressable memory (TCAM) for the final search key lookup operation in the packet classification process. TCAMs are well-known devices in which each cell of the memory can take three logic states, namely "0", "1" or "X" (undefined or "don't care"), and are discussed in the context of packet classification lookup operations in Proceedings of Hot Interconnects VIII, August 2000, pp145–153, "Fast incremental updates on Ternary-CAMs for routing lookups and packet classification", D. Shah and P. Gupta. While TCAMs have been employed previously for packet classification lookup operations, in particular for IP forwarding based on longest matching prefix lookup, making efficient use of a TCAM in a multidimensional packet classification system is a far from straightforward task.

SUMMARY OF THE INVENTION

According to a first aspect of the present invention there is provided a method for classifying a data packet in a data processing device to determine which of a plurality of predefined processing rules applies to the data packet, each said rule being associated with a range of possible data values in each of a plurality of dimensions corresponding to respective data items in the data packet. The method comprises:
(a) for each dimension, identifying the corresponding data value in the packet and determining which of a set of predefined basic ranges contains that data value, wherein the basic ranges correspond to respective non-overlapping value ranges between successive rule range boundaries in that dimension;
(b) for the basic range so determined for each dimension, selecting a corresponding basic range identifier from a set of predefined basic range identifiers corresponding to respective basic ranges in that dimension, wherein, for each of at least two dimensions, the basic range identifiers comprise respective $p_D$-bit strings generated independently for that dimension by
(b1) defining a hierarchy of primitive ranges, which correspond to respective portions of the rule ranges between rule range boundaries in that dimension such that each rule range in the dimension is represented by one or more primitive ranges, wherein primitive ranges in the same level of the hierarchy are non-overlapping and each primitive range in a level above the lowest hierarchy level is a subset of a primitive range in the level below,
(b2) assigning a primitive range identifier to each primitive range in the hierarchy such that primitive ranges in the lowest level have different identifiers and, in each higher level, any ranges which are subsets of the same range in the level below have different identifiers, and
(b3) producing a unique $p_D$-bit basic range identifier for each basic range such that the $p_D$-bit identifier comprises a concatenation of the primitive range identifiers for the primitive ranges intersected by that basic range, the primitive range identifiers being concatenated in order of increasing hierarchy level;
(c) combining the basic range identifiers for said plurality of dimensions to produce a search key;
(d) supplying the search key to a ternary content-addressable memory; and
(e) in the memory, comparing the search key with a set of prestored ternary rule vectors, each associated with a said rule and derived for that rule in dependence on the hierarchy for each of said at least two dimensions, to identify at least one rule which applies to the data packet.

In packet classification methods embodying this aspect of the invention therefore, the values of the data items (such as source address, destination address, source port, destination port, protocol etc.,) which correspond to the respective dimensions are mapped to basic range identifiers, the appropriate basic range identifier in each case being selected from a predefined set as that corresponding to the basic range containing the data value in question. For the basic ranges in each of two or more dimensions, the basic range identifiers comprise respective $p_D$-bit strings which are generated independently for that dimension by steps (b1) to (b3) above, where $p_D$ is of course an integral value and may be different for different dimensions. The resulting basic range identifiers, one for each dimension, are then combined to produce a search key which is supplied to a TCAM for comparison with the ternary rule vectors, the results of this comparison indicating at least one rule to be applied to the data packet.

In contrast to our earlier application referenced above, therefore, the basic range identifiers in at least two dimensions are generated independently for those dimensions by a process of building primitive range hierarchies. No rule preprocessing or ordering need be performed, the primitive range hierarchies being constructed by considering the rule ranges in each dimension individually without having to consider the rule ranges in other dimensions. The basic range identifiers resulting from this independent generation process are such as to allow highly efficient use to be made of the TCAM. The data structure stored in the TCAM is necessarily dependent on the basic range identifiers, in particular since the ternary rule vectors are derived from the same primitive range hierarchies. Methods embodying the present invention provide a highly efficient data structure, allowing exceptionally efficient use of a TCAM for multidimensional packet classification. Overall, very significant advantages in terms of increased classification performance, reductions in storage requirements and reduced update complexity, can be achieved with methods embodying the invention as compared with the previous methods referenced above.

Embodiments can be envisaged in which the basic range identifiers used for two or more, but not all, of the dimensions are generated independently for the individual dimensions by steps (b1) to (b3), any convenient set of basic range identifiers being used for the remaining dimensions. For maximum efficiency, however, the basic range identifiers are preferably independently generated as discussed above for each of the dimensions covered by the rule set. Embodiments of the packet classification method may also include, prior to performing step (a) for a first data packet, the steps of generating the set of basic range identifiers for each of the plurality of dimensions, deriving the set of ternary rule vectors in dependence on the hierarchy for each of said at least two dimensions, and storing the rule vectors in the TCAM. A detailed explanation of the various steps of the packet classification process, including further features employed in preferred embodiments, will be given hereinafter.

The invention also extends to apparatus for classifying data packets in accordance with the method set forth above. In particular, a second aspect of the present invention provides apparatus for classifying a data packet to determine which of a plurality of predefined processing rules applies to the data packet, each said rule being associated with a range of possible data values in each of a plurality of dimensions corresponding to respective data items in the data packet, the apparatus comprising:

a first memory storing, for each said dimension, a set of basic range identifiers corresponding to respective basic ranges in that dimension, wherein the basic ranges correspond to respective non-overlapping value ranges between successive rule range boundaries in that dimension, and for each of at least two dimensions, the basic range identifiers comprise respective $p_D$-bit strings generated independently for that dimension by defining a hierarchy of primitive ranges, which correspond to respective portions of the rule ranges between rule range boundaries in that dimension such that each rule range in the dimension is represented by one or more primitive ranges, wherein primitive ranges in the same level of the hierarchy are non-overlapping and each primitive range in a level above the lowest hierarchy level is a subset of a primitive range in the level below, assigning a primitive range identifier to each primitive range in the hierarchy such that primitive ranges in the lowest level have different identifiers and, in each higher level, any ranges which are subsets of the same range in the level below have different identifiers, and producing a unique $p_D$-bit basic range identifier for each basic range such that the $p_D$-bit identifier comprises a concatenation of the primitive range identifiers for the primitive ranges intersected by that basic range, the primitive range identifiers being concatenated in order of increasing hierarchy level;

a ternary content-addressable memory storing a set of ternary rule vectors, each associated with a said rule and derived for that rule in dependence on the hierarchy for each of said at least two dimensions; and control logic configured to identify the data value in the packet corresponding to each said dimension, to access the first memory to retrieve the basic range identifier corresponding to the basic range containing the data value so identified for each dimension, to combine the basic range identifiers for said plurality of dimensions to produce a search key, and to supply the search key to the ternary content-addressable memory for comparison with said ternary rule vectors to identify at least one rule which applies to the data packet.

The methods and apparatus discussed thus far address the classic multidimensional packet classification problem where packets must be classified according to the values of a plurality of data items in the packet for which conditions are specified in the rule set. However, a third aspect of the present invention provides a method for classifying data packets in a data processing device according to the values in respective data packets of a predetermined data item in the data packet format, where a plurality of classification results are defined in the device for respective ranges of values of that data item. This method comprises, for each data packet:

(a) segmenting said predetermined data item into a plurality of segments of predetermined length;

(b) for each segment, selecting, in dependence on the value of that segment, a corresponding segment identifier from a predefined set of segment identifiers associated with respective ranges of segment values, the corresponding identifier being that associated with a range containing the value of said segment;

(c) combining the segment identifiers selected for said plurality of segments to produce a search key;

(d) supplying the search key to a ternary content-addressable memory; and (e) in the memory, comparing the search key with a set of prestored ternary classification vectors, each associated with a said classification result and derived for that classification result in dependence on the segment identifiers corresponding to segment values contained in the range of data item values for that classification result, to identify a classification result for the data packet.

This aspect of the invention is predicated on the realization that a single dimensional search (where some processing instruction/operation for data packets is determined based on the value of the same data item in all packets) can be efficiently implemented using a TCAM in a similar manner to a multidimensional packet classification search by segmenting the data item in question into a plurality of segments. The different segments can then be equated to different dimensions of the multidimensional problem and processed in a similar manner. The problem of single search key lookups (e.g. routing lookups in a routing table of a node based on the destination address field of the packet header) is generally considered to be well-solved and to be far simpler than the multidimensional problem. In embodiments of this aspect of the invention, however, contrary to the established practice, a single search key lookup operation is treated as a multidimensional packet classification problem, allowing highly efficient use of the TCAM. The classification performed here is to determine which of a plurality of classification results applies to each of the data packets based on the value of a single, predetermined data item in the packet format.

In general, the data item in question may be any item of the packet format, and the classification results here may represent various instructions, operations etc., to be implemented for the packets depending on the specified data item value. For each classification result, therefore, an associated range of data item values is defined such that a given classification result applies to a packet if the data item value is within the specified range. (Such a range may, in general, comprise a series of one or more values, and may be expressed in various ways as with the rule ranges discussed earlier. Moreover, a priority scheme may be employed as before to identify a single result where more than one result may apply to a given packet). Address lookups for routing purposes provide one exemplary application here. In such lookup operations, the "next hop" in the route for forwarding of a data packet in a network is determined based the value of an address field in the packet, usually the destination address. A set of destination address prefixes, and the next hop for each prefix, are typically defined in the device such that all packets whose destination address begins with a specified prefix are forwarded according to the next hop indicated for that prefix, the longest matching prefix being selected where more than one applies. In embodiments for this type of application, therefore, the classification results correspond to the next hop indicators, and the associated ranges of data item values are specified by the corresponding address prefixes.

Whatever the particular data items and classification results employed in the classification method, for each data packet the data item is segmented as described above. Each segment is then mapped to a corresponding segment identifier in accordance with step (b) above, and the resulting segment identifiers, one for each segment, are combined to produce a search key. The search key is then used to address the TCAM which compares the search key with the ternary classification vectors, a classification result for the packet being identified from the results of this comparison. Various schemes may be employed for generating the segment identifiers, and the ternary classification vectors dependent on these identifiers, that are used in this process. However, extremely efficient results can be achieved by employing a system of basic range identifiers based on primitive range hierarchies as for multidimensional methods embodying the earlier aspects of the invention. Preferred embodiments thus employ this system for at least one, and ideally all, of the segments as explained in more detail below.

A fourth aspect of the present invention provides apparatus for classifying data packets according to the values in respective data packets of a predetermined data item in the data packet format, a plurality of classification results being predefined for respective ranges of values of the data item, the apparatus comprising:

control logic configured to segment said predetermined data item in each data packet into a plurality of segments of predetermined length;

a first memory for storing a set of segment identifiers corresponding to respective ranges of segment values for each of said plurality of segments; and a ternary content-addressable memory for storing a set of ternary classification vectors, each associated with a said classification result and derived for that classification result in dependence on the segment identifiers corresponding to segment values contained in the range of data item values for that classification result;

wherein the control logic is further configured to access the first memory to retrieve, for each said segment, the segment identifier corresponding to the range of segment values containing the value of that segment, to combine the segment identifiers retrieved for said plurality of segments to produce a search key, and to supply the search key to the ternary content-addressable memory for comparison with said ternary classification vectors to identify a classification result for the data packet.

In general it is to be understood that, where features are described herein with reference to a method embodying the invention, corresponding features may be provided in apparatus embodying the invention, and vice versa.

Preferred embodiments of the invention will now be described, by way of example, with reference to the accompanying drawings in which:

DETAILED DESCRIPTION OF THE INVENTION

Figure 1:
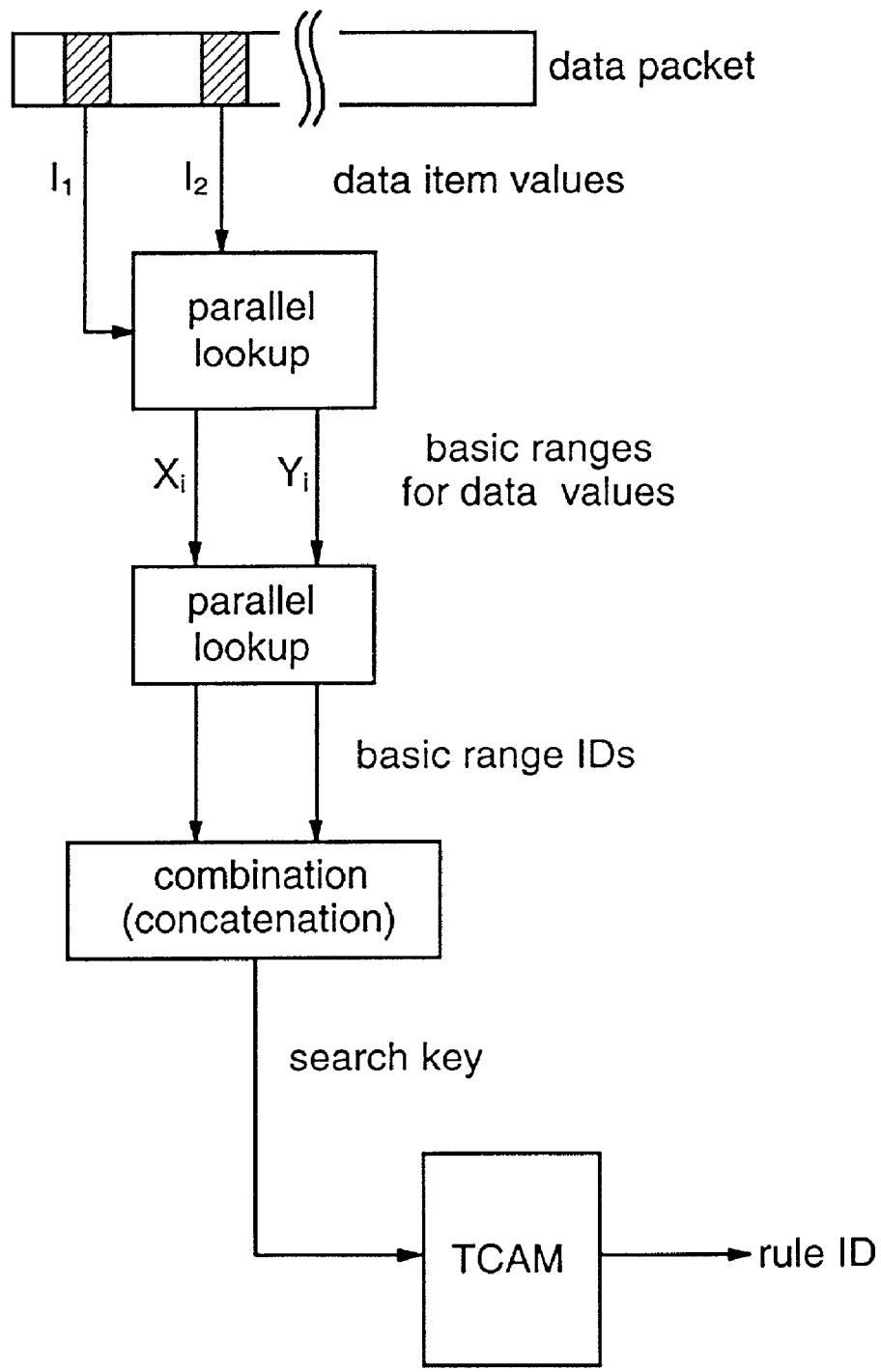
FIG. 1 gives a general overview of a first packet classification system embodying the invention.

The diagram of FIG. 1 gives a general overview of a first embodiment of a packet classification system. This system is employed for multidimensional packet classification where packets are classified according to the values of a plurality of data items in the packet header. For simplicity it is assumed here that packet classification is based on only two data items, such as source and destination address, in the packet format. In general, of course, multiple data items may be involved in the classification process, but the operation for multiple dimensions will be readily apparent from the following description of two-dimensional systems. The two data items to be evaluated are illustrated by the shaded sections of the data packet at the top of FIG. 1. First, the packet is parsed to identify the data item values in question, and the resulting data values (here $I_1$ and $I_2$) are supplied as inputs to a parallel memory lookup operation. For each input value $I_1$ and $I_2$, this operation identifies a basic range, indicated here by $X_i$ and $Y_1$ respectively, corresponding to that input value as explained further below. The indicators $X_1$ and $Y_1$ are then supplied as inputs to a further parallel memory lookup operation where each indicator is mapped to a corresponding basic range identifier as explained further below. The resulting basic range identifiers are then combined (in the embodiments to be described below by simple concatenation) to generate a search key. This search key is supplied to a TCAM where it is compared with a set of ternary rule vectors as described further below to identify the appropriate rule to be applied to the data packet. The basic ranges, basic range identifiers and ternary rule vectors used in this process will now be explained with reference to FIGS. 2 to 4.

Figures 2, 3:
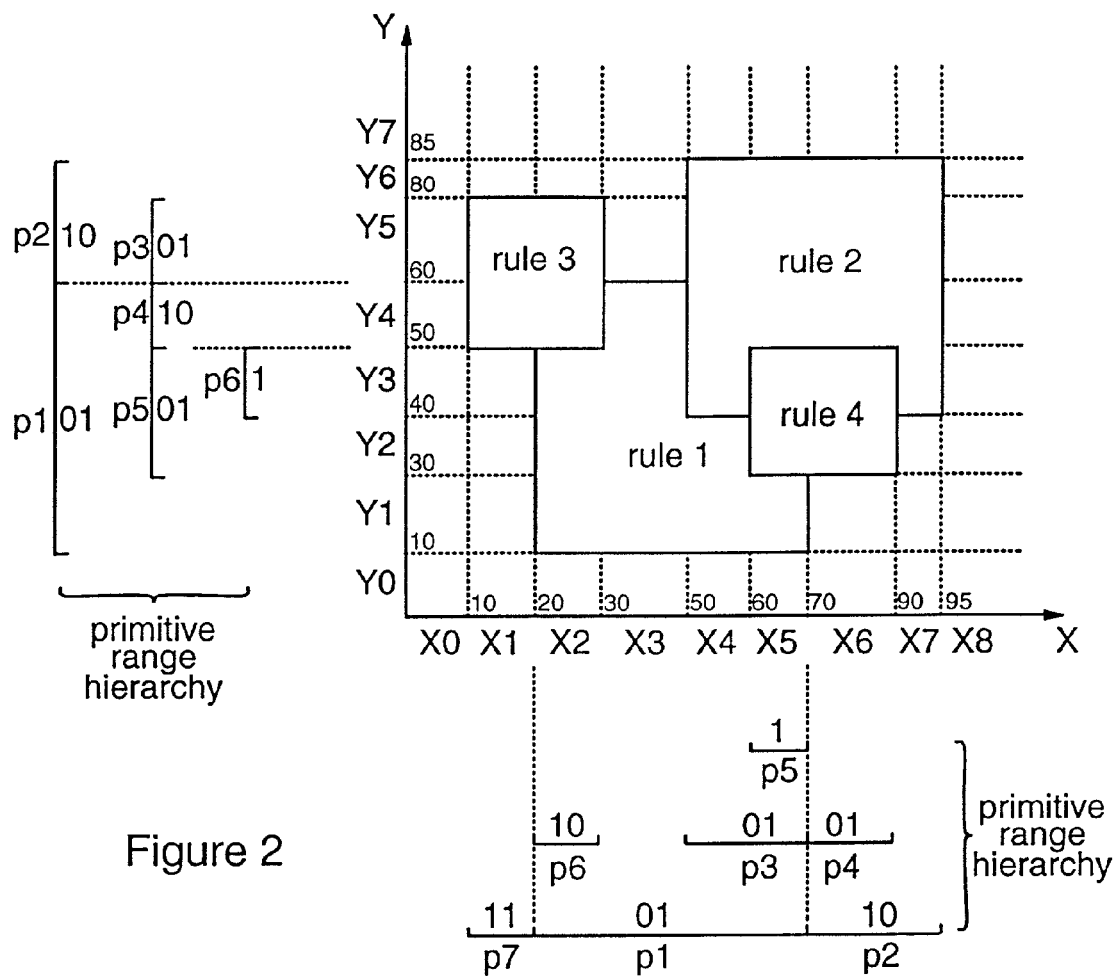
FIG. 2 shows a rule range diagram illustrating basic ranges and primitive range hierarchies for one example of the first embodiment.
FIG. 3 is a table indicating basic range identifiers for the example of FIG. 2.

The rule range diagram of FIG. 2 demonstrates how the packet classification rules defined in the system are used to derive particular sets of basic range identifiers employed in the above process. In the simple example shown, it is assumed that there are only four rules defined in the system, each rule specifying a series of possible values of both $I_1$ and $I_2$ for which, in combination, the rule applies. Each rule can thus be represented by a rectangle in two-dimensional value space as indicated by the X and Y axes in the figure, where the X-dimension corresponds to values of $I_1$ and the Y-dimension to values of $I_2$. In the example illustrated, the four rules are characterized as follows:

| Rule | Priority | X Rule Range | Y Rule Range |
|---|---|---|---|
| 1 | 1 | 20–69 | 10–59 |
| 2 | 2 | 50–94 | 40–84 |
| 3 | 2 | 10–29 | 50–79 |
| 4 | 3 | 60–89 | 30–49 |

Here, a priority order is defined for the rules to indicate the priority with which the rules are to be applied if a given packet satisfies the conditions of more than one rule. In such cases, the highest priority rule is selected for the packet. The priority number in column 2 above signifies the relative priority rating of the rules, a higher priority being signified by a higher priority number. In FIG. 2, here two rules overlap, the rectangle representing the higher priority rule is shown on top.

In the figure, the intervals labeled X0 to X8 and Y0 to Y7 indicate the basic ranges in the X and Y dimensions respectively for this embodiment. It can be seen that these basic ranges correspond to respective non-overlapping value ranges between successive rule range boundaries in each dimension. These ranges are obtained by projecting the rule range boundaries onto the X and Y axes respectively, whereby, for a given basic range in one dimension, no change of applicable rule occurs in that range for a fixed value in the other dimension. Of course, while the basic ranges in this example are shown as either five, ten or twenty units wide (e.g. X7=90 to 94; X1=10 to 19; Y5=60 to 79), in practice each range might have any width, corresponding to a range of one or more values, depending on the particular rule ranges in the system. Note also that ranges X0, Y0, X8 and Y7 have only one limit (e.g. X0=less than 10, Y7=greater than 84, etc.). While these ranges are defined for convenience in the present embodiment, these ranges could be omitted in other embodiments since within these ranges none of the rules are applicable. (In particular, if it is determined that, for example, an X-dimension value $I_1$ falls within none of the basic ranges X1 to X7, then it is known that none of the rules will be applicable).

It will be seen from the foregoing how the data values $I_1$ and $I_2$ in FIG. 1 can be mapped to a basic range in the corresponding dimension in the first lookup operation. For each dimension, the basic ranges are tabulated and the output of the lookup operation gives the basic range indicator ($X_1$=X0, X1, . . . etc., or $Y_1$=Y0, Y1, . . . etc.) for the basic range which contains the input data value. In the next lookup operation, the basic ranges $X_1$, $Y_1$ so obtained are mapped to basic range identifiers which are derived from primitive range hierarchies for each dimension. A primitive range hierarchy is defined as follows on the basis of primitive ranges in each dimension. The primitive ranges correspond to respective portions of the rule ranges between rule range boundaries, and the hierarchy is constructed such that: 1) primitive ranges in the lowest hierarchy level are non-overlapping; and 2) each primitive range in a level above the lowest hierarchy level is a subset (i.e. coextensive with or contained within, and most preferably contained within) a primitive range in the level below. The order in which primitive ranges are selected and the hierarchy constructed is not critical here, though in this preferred embodiment primitive ranges are selected generally according to decreasing rule range size in the dimension. Thus, the hierarchy for the X-dimension in FIG. 2 is constructed as follows.

The rule range for rule 1 is selected first as primitive range p1 in the lowest hierarchy level. Next, primitive range p2 is selected as the portion of rule 2's range between the upper boundaries of rules 1 and 2, and assigned to the lowest hierarchy level. The remaining portion of rule 2's range is contained within primitive range p1. This range is therefore a subset of primitive range p1 and so is assigned to the second hierarchy level as primitive range p3. The portion of rule 4's range between the upper boundaries of rules 1 and 4 is a subset of primitive range p2 and so is assigned to the second hierarchy level as primitive range p4. The remaining portion of rule 4's range is a subset of primitive range p3 and is assigned to the third hierarchy level as primitive range p5. The portion of rule 3's range above the lower boundary of rule 1 is a subset of primitive range p1 and so forms primitive range p6 in the second hierarchy level. The remaining portion of rule 3's range forms primitive range p7 in the lowest hierarchy level.

A similar process for the Y-dimension rule ranges yields the hierarchy of primitive ranges p1 to p6 in this dimension as shown in the figure. Again, the primitive ranges are selected in this example generally in order of decreasing rule range size in the dimension, though variations can be made according to the particular rule range pattern in the dimension where desired to simplify the resulting hierarchy. Here, for example, the portion of rule 2's range below the upper boundary of rule 1 is not represented by a single primitive range, but rather by primitive ranges p4 (which also represents a portion of rule 3) and p6. In any case, it can be seen from the resulting hierarchies that, in each dimension, each rule range is represented by a set of one or more primitive ranges. For example: in the X-dimension rule 1's range is represented by the single primitive range p1, whereas rule 4's range is represented by the two primitive ranges p4 and p5; in the Y-dimension rule 2's range is represented by the three primitive ranges p2, p4 and p6; and so on.

The next step in generating the basic range identifiers involves assigning primitive range identifiers to the primitive ranges in each hierarchy. The basic rule here is that: (1) primitive ranges in the lowest hierarchy level should have different identifiers; and (2) in the or each higher level, primitive ranges which are subsets of the same range in the level below should have different identifiers. This is preferably ensured by assigning identifiers such that identifiers assigned to the following groups: (a) primitive ranges in the lowest hierarchy level; and (b) higher-level primitive ranges which are subsets of the same range in the level below, are prefix unique within that group (i.e. none is a prefix of another identifier in the group). In the example shown, this is ensured in turn by applying the more general "different identifier rule", i.e. (1) and (2) above, with the further constraint that primitive range identifiers within the same level of the hierarchy have the same number of bits. On this basis, the particular primitive range identifiers assigned in this example are noted in the figure, above the corresponding primitive range in the X-dimension hierarchy, and to the right of the corresponding primitive range in the Y-dimension hierarchy. Thus for example, in the X-dimension range p1 has primitive range identifier 01 and range p5 has identifier 1, and in the Y-dimension range p3 has primitive range identifier 01 and range p4 has identifier 10, etc.

After defining the primitive range hierarchies and assigning the primitive range identifiers, the basic range identifiers are produced as follows. In each dimension, for each basic range spanned by any of the rule ranges (i.e. excluding ranges X0, X8, Y0 and Y7 in this example), a unique $p_D$-bit basic range identifier is produced by concatenating, in order of increasing hierarchy level, the primitive range IDs for the primitive ranges intersected by that basic range. The number $p_D$ here may be different for different dimensions, and is preferably determined by the number of bits in the longest concatenation so obtained. Where the concatenation of primitive range IDs results in a string of less than $p_D$ bits for a given basic range, the resulting concatenation is then made up to a $p_D$-bit string by adding additional bits. In the present example, each $p_D$-bit basic range identifier begins with the aforementioned concatenation, and is then made up (where necessary) to a $p_D$-bit string by adding bits of value 0. (Other possibilities may be envisaged here for producing the basic range IDs from the concatenated primitive range IDs, but this provides a particularly simple solution. It is for this reason that, in the hierarchies of FIG. 2, all-zero primitive range IDs are avoided). Thus, considering the X-dimension in FIG. 2, basic range X1 intersects only primitive range p7. The basic range ID for X1 therefore begins with the primitive range ID (1) for p7, and is made up to a 5-bit string by adding zeros. ($p_D$=5 here since the longest concatenation of primitive range identifiers, namely that for X5, is 5 bits long). This gives a basic range ID for X1 of 11000. Basic range X2 intersects primitive ranges p1 and p6. Concatenating the primitive range IDs for p1 and p6 in increasing hierarchy-level order yields 0110, and one zero is then added to give a basic range ID for X2 of 01100. A similar process for basic ranges X3 to X7 yields the basic range IDs shown in FIG. 3 for these ranges. Ranges X0 and X8 are simply assigned all-zero basic range IDs in this embodiment. The complete set of basic range IDs for the X-dimension is therefore given on the left-hand side of FIG. 3. A similar process for the Y-dimension yields a set of basic range IDs for this dimension as shown on the right-hand side of FIG. 3.

Referring back to FIG. 1, after the second lookup operation which outputs the basic range IDs corresponding to $I_1$ and $I_2$, these IDs are then combined to produce a search key. In this preferred embodiment, the search key is produced by simple concatenation, in a predefined order, of the basic range IDs for the various (here 2) dimensions. This search key will then be compared with the ternary rule vectors stored in the TCAM. These ternary rule vectors are dependent, via the primitive range hierarchies, on the basic range IDs, and more specifically are generated from a concatenation of "subvectors" which are determined for each rule from the primitive range hierarchies in each dimension. This process will now be explained in detail.

For each rule, a set of one or more subvectors is defined based on the hierarchy in each dimension. Specifically, in each dimension, a subvector is defined corresponding to each of the primitive ranges which represents the rule range in that dimension. The subvector corresponding to a given primitive range begins with a concatenation, in order of increasing hierarchy level, of the primitive range ID of that range with the primitive range IDs of any lower level primitive range of which that range is a subset. The resulting concatenation is then made up (where necessary) to $p_D$-bits for that dimension by bits of value X (i.e. don't care). For example, considering rule 1 in the X-dimension of FIG. 2, the rule range is represented here by a single primitive range, i.e. p1, in the lowest hierarchy level. A single subvector is therefore defined for rule 1 in this dimension. This subvector begins with the primitive range ID of p1 (01) and is made up to $p_D$=5 bits by adding Xs. This yields a single subvector for rule 1 in the X-dimension of 01XXX. In the Y-dimension, rule 1's range is again represented by a single primitive range, here p1, in the lowest hierarchy level. A single subvector is therefore defined for rule 1 in this dimension, beginning with the primitive range ID of p1 (01) and adding Xs up to 5 bits, yielding 01XXX once again.

Figures 4, 5:
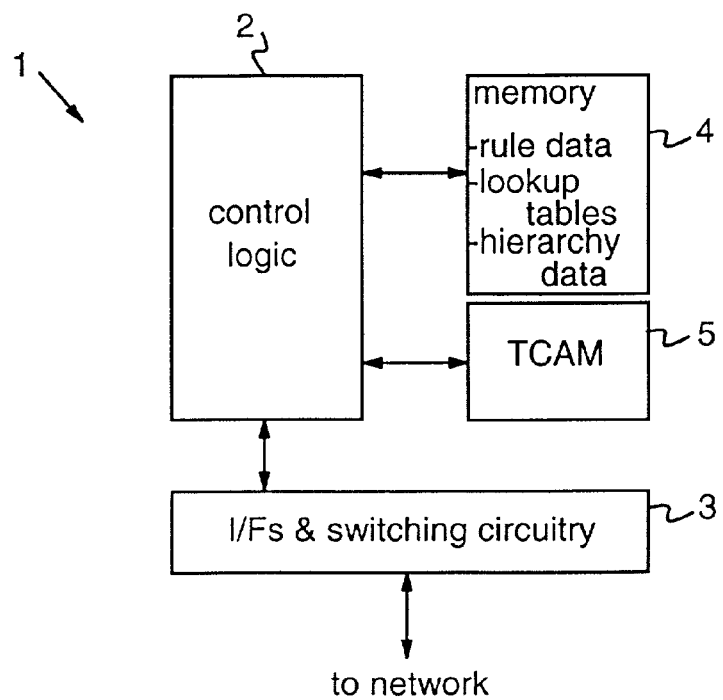
FIG. 4 is a table indicating ternary rule vectors for the example of FIG. 2.
FIG. 5 is a schematic block diagram of a data processing device for implementing packet classification methods embodying the invention.

The rule vectors for a given rule are generated from concatenations of the subvectors for that rule, one for each dimension, in the same dimension order as that used for the search key concatenation. In this first embodiment, the set of rule vectors for a given rule is generated as the set of such concatenations of subvectors for all possible combinations of subvectors for that rule. Thus for the simple case of rule 1 above where there is only a single subvector in each dimension, there is only one possible combination of subvectors and hence one rule vector, namely 01XXX01XXX. This is therefore stored in the TCAM against a rule ID for rule 1, as indicated by the last entry in the rule vector table of FIG. 4. Considering now rule 2, the rule range in the X-dimension here is represented by the two primitive ranges p2 and p3 in the X-dimension hierarchy of FIG. 2. Since p2 (primitive range ID 10) is in the lowest hierarchy level, the rule 2 subvector corresponding to p2 is given by 10XXX. P3 however is in the second hierarchy level and is a subset of lower-level range p1. The primitive range ID for p3 (01) is therefore concatenated with that for p1 (01), in order of increasing hierarchy level, to give 0101, and this concatenation is made up to 5 bits by adding one X, thus yielding a subvector of 0101X. Similar analysis for rule 2's range in the Y dimension yields three subvectors (corresponding to p2, p4 and p6) of 10XXX, 0110X and 01011. The two X-dimension subvectors for rule 2 and the three Y-dimension subvectors for this rule can be combined (in X,Y concatenations) in six ways, yielding the six rule vectors for rule 2 shown in FIG. 4. Similar analysis for the other rules yields four rule vectors for rule 3 and two rule vectors for rule 4 as indicated in FIG. 4.

Having illustrated how the classification data used in the packet classification process is generated, the operation of a data processing device implementing the classification process will now be described. FIG. 5 is a schematic block diagram of one embodiment of a data processing device for connection as a node of a network system, and illustrating the main elements involved in packet classification methods embodying the invention. The device 1 includes control logic 2 which is connected to communications circuitry 3 comprising the interfaces and switching circuitry via which he device communicates with the rest of the network. The control logic 2 is further connected to memory 4 for storing various data involved in the packet classification process, in particular data defining the rule set, the lookup tables for the basic ranges and basic range ID sets in different dimensions, and data defining the primitive range hierarchy in each dimension. (Of course, while memory 4 is represented by a single block in the figure, in practice memory 4 may be implemented by one or more memories). Control logic 2 is also connected to TCAM 5 which stores the rule vectors and associated rule IDs as discussed above. The control logic 2 may control operation of the device generally, implementing the various network functions performed by the device. In addition, the control logic 2 controls implementation of the various steps of the packet classification process. In general, the control logic 2 may be implemented in hardware or software, or a combination thereof, but will typically be implemented by a processor running software which configures the processor to perform the functions described, and suitable software will be apparent to those skilled in the art from the description herein. (Of course, while the processor may be preconfigured with appropriate software, the program code constituting such software could be supplied separately for loading in the device to configure the processor to operate as described. Such program code could be supplied as an independent element or as an element of the program code for a number of control functions, and may be supplied embodied in a computer-readable medium, such as a diskette or an electronic transmission sent to a network operator for example, for loading in the device).

Figure 6:
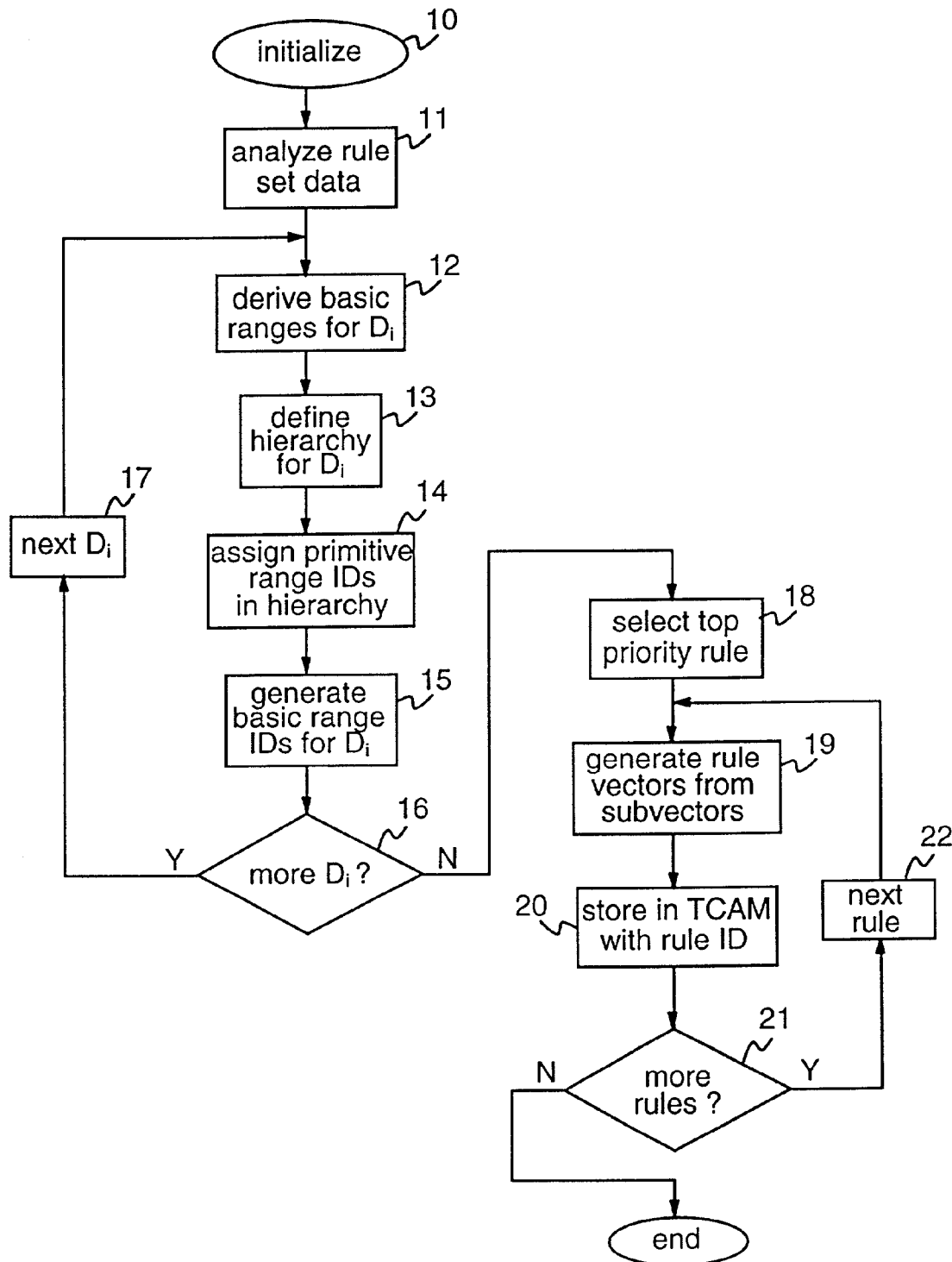
FIG. 6 is a flow chart illustrating an example of a process for initializing packet classification data in the device of FIG. 5.

The flow chart of FIG. 6 shows one example of the operations performed by the control logic 2 to initialize the classification data, that is, to derive the data required for the packet classification process from the rule set data. The initialization process is commenced at step 10, and in step 11 the control logic analyzes the rule set data stored in memory 11 to identify the dimensions for which rule ranges are defined in the rule set. Next, in step 12, the control logic derives the basic ranges for a first of these dimensions $D_1$, by the process described in detail above, and stores these basic ranges in a table of memory 4. In step 13, the control logic derives the primitive range hierarchy for the first dimension as detailed above, and hierarchy data defining this hierarchy is again stored in memory 4. In step 14, the control logic assigns primitive range IDs as detailed above, and stores these IDs for the hierarchy in memory 4. Then, in step 15, the control logic generates the set of basic range IDs for the dimension as described above, and stores these in a table of memory 4. The control logic then checks whether there are further dimensions to be considered, and if so (as indicated by a "Yes" at decision block 16), the next dimension is selected at step 17 and operation reverts to step 12 for this dimension. When all dimensions have been considered, as indicated by a "No" at step 16, operation proceeds to step 18. Here the control logic selects the highest priority rule in the rule set, and, in step 19, generates the rule vectors for this rule from subvectors derived from the primitive range hierarchies as detailed above. In step 20, the resulting rule vectors are stored in the TCAM against a rule ID for the rule in question. In step 21 the control logic checks whether there are further rules to consider, and if so ("Yes"), the next highest priority rule is selected at step 22 and operation reverts to step 19 for this rule. By the time that all rules have been considered (as indicated by a "No" at step 21), the complete set of rule vectors has been stored in the TCAM in priority order of the rules in the rule set. The initialization process is then complete.

Figure 7:
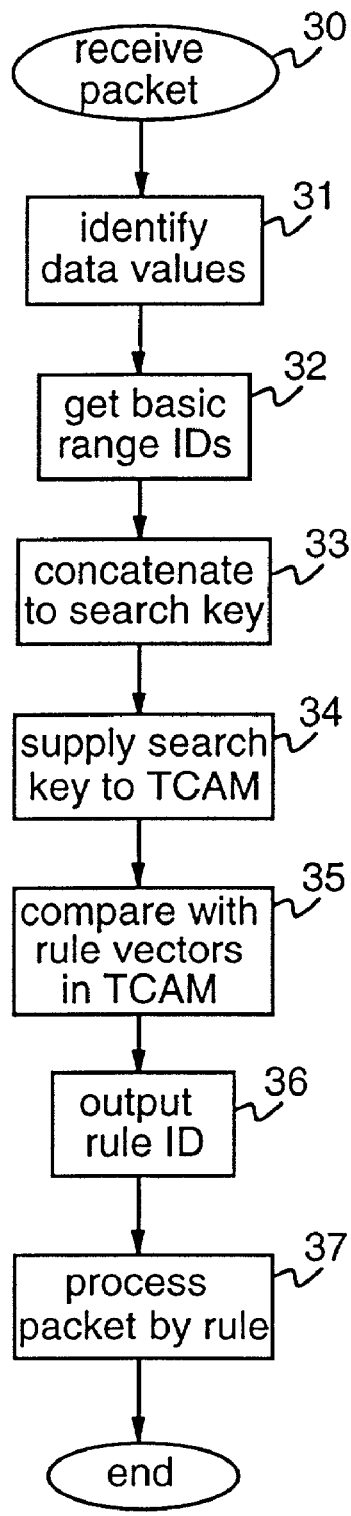
FIG. 7 is a flow chart illustrating basic steps in a packet classification process performed by the device of FIG. 5.

Once the classification data has been initialized, the device is ready for classifying data packets. The flow chart of FIG. 7 illustrates the basic steps of the classification process performed by the device, and corresponds generally to the schematic of FIG. 1. After receipt of a packet at step 30 via circuitry 3 of the device, the control logic 2 identifies the data values for the various dimensions at step 31, and then accesses memory 4 to retrieve, from the appropriate tables for each dimension, the basic range identifier corresponding to each of these values as described above. (Note that, while the mapping of data values to basic range IDs has been described earlier as a two stage process, involving accessing a first set of tables to identify the basic ranges and a second set of tables to retrieve the basic range IDs, in practice these operations may be combined in a single stage if desired. For example, the outputs of the first set of parallel memory accesses in FIG. 1 may be the basic ranges IDs themselves, rather than indicators $X_1$, $Y_1$, though the basic ranges for the data values are nevertheless implicitly determined in this process). Following step 32, at step 33 the control logic concatenates the basic range IDs so retrieved and supplies the resulting search key to the TCAM 5 at step 34. In the TCAM, the search key is compared with the prestored rule vectors at step 35, and the rule ID for the first matching rule vector entry in the rule vector list is output by the TCAM at step 36. On receipt of the rule ID from the TCAM 5, at step 37 the control logic 2 processes the data packet as specified by the corresponding rule, and the classification process is complete for that data packet.

Consideration of the example of FIGS. 2 to 4 demonstrates that the result of steps 35 and 36 in FIG. 7 is to identify the highest priority rule which applies to the data packet. Consider for example a packet with values $I_1$ and $I_2$ in basic ranges X4 and Y3 respectively. The basic range IDs for these ranges are (from FIG. 3) 01010 and 01011 respectively, resulting in a search key of 0101001011. The first rule vector in the table of FIG. 4 which matches this search key is entry 11, giving the rule ID for rule 2. It can be seen from the rule range diagram of FIG. 2 that this is indeed the appropriate rule, and similar analysis for other combinations of $I_1$ and $I_2$ yields the highest priority rule in each case.

While the TCAM entries are stored in rule priority order in the above example, so that a single highest-priority applicable rule is identified, other systems can be envisaged here. For example, the TCAM could output the rule IDs of all rule vectors which match a search key, in which case ordering of the rule vectors is not required. Here, the control logic may be configured to determine which of the applicable rules should be applied to a data packet, selecting one (e.g. the highest priority rule) or more than one if appropriate.

Figures 8, 9:
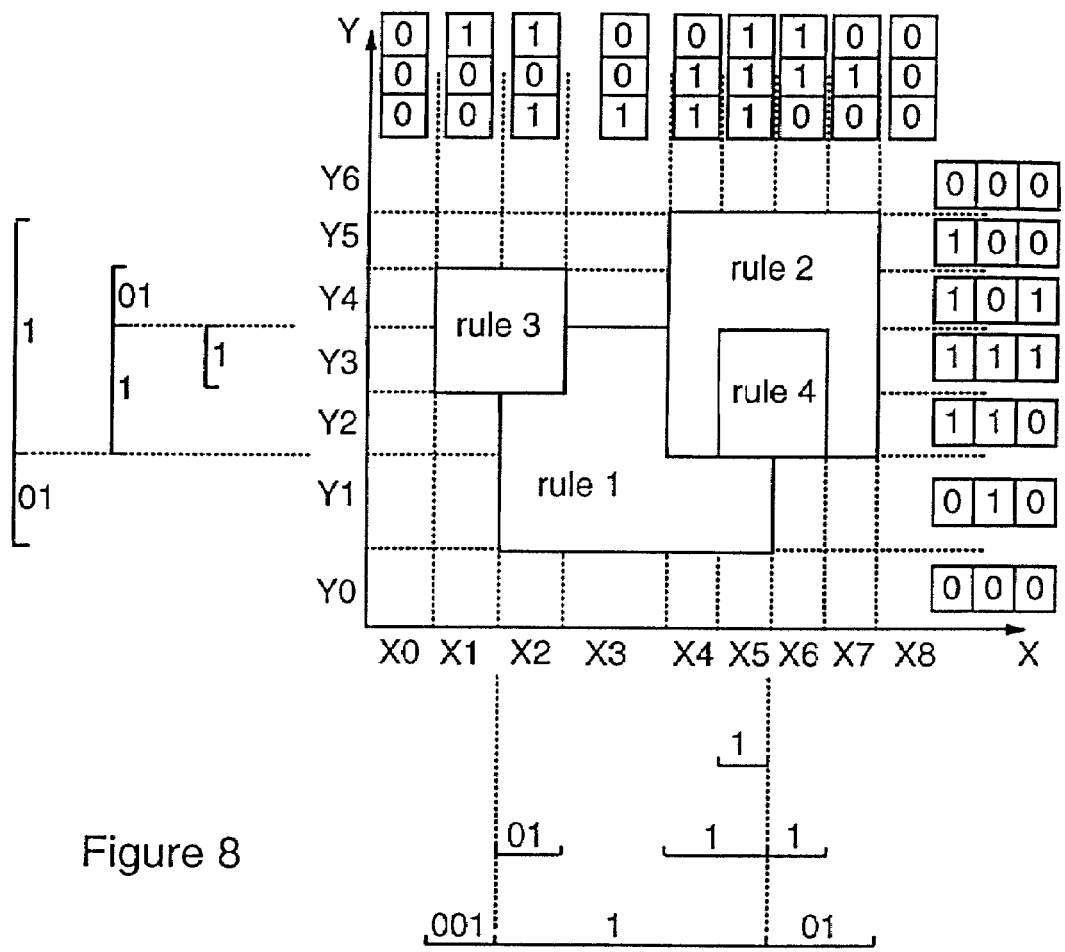
FIG. 8 shows a rule range diagram illustrating an example of packet classification data in an alternative embodiment.
FIG. 9 is a table showing a reduced set of ternary rule vectors for the example of FIG. 8.

A variation on the process detailed above for generating basic range IDs, and an optimization step in the generation of ternary rule vectors, will now be described with reference to FIGS. 8 and 9. FIG. 8 shows a rule range diagram for a variation on the rule set of FIG. 2, with the primitive range hierarchies for the X and Y dimensions indicated as before. Here, however, the primitive range IDs are assigned using the "prefix unique rule" mentioned earlier. That is, the primitive range IDs within the same level of the same hierarchy are not the same length as in FIG. 2, but the IDs for ranges in the lowest level of each hierarchy are prefix unique, none being a prefix of another. Similarly, in higher levels of each hierarchy, the IDs of any ranges which are subsets of the same range in the level below are prefix unique. For example, in the Y-dimension hierarchy, the two ranges in the second level are both subsets of the same range in the level below, so the identifiers assigned to these primitive ranges are prefix unique.

The basic range identifiers, derived as before, are also shown in FIG. 8, those for the X-dimension ranges being shown at the top of the figure, and those for the Y-dimension ranges at the right of the figure. Generation of the ternary rule vectors for this example using the process detailed above yields the following set of rule vectors:

| Rule 1: | 1XX01X |
| --- | --- |
|  | 1XX11X |
| Rule 2: | 11X1XX |
|  | 01X1XX |
| Rule 3: | 001111 |
|  | 001101 |
|  | 101111 |
|  | 101101 |
| Rule 4: | 11111X |
|  | 01111X |

These rule vectors represent the set of all possible combinations of subvectors for each rule in X,Y concatenations as described earlier. While this already represents an efficient data structure for storage in the TCAM, in a further preferred embodiment this data structure is further optimized. In particular, a reduced set of rule vectors is obtained by eliminating redundancy in this initial rule vector set. This is achieved by the following optimization operation. If any two vectors that relate to the same rule are different only at one bit position, such that one vector contains a "0" and the other a "1" at this position, then these two vectors can be merged into a new vector with an "X" at this bit position. This results in the following reductions in the above vector set:

Rule 1: 1XX01X and 1XX11X can be merged into 1XXX1X
Rule 2: 11X1XX and 01X1XX can be merged into X1X1XX
Rule 3: 001111 and 001101 can be merged into 0011X1
   101111 and 101101 can be merged into 1011X1 and these
   two merged vectors can again be merged into X011X1
Rule 4: 11111X and 01111X can be merged into X1111X The resulting reduced set of ternary rule vectors, as shown in FIG. 9 in rule priority order, can then be stored in the TCAM.

It will be seen from the examples detailed above that embodiments of the invention provide extremely efficient packet classification systems in which highly effective use is made of TCAMs in the multidimensional classification process. Simulations with real rule bases have shown enormous reductions in data structure size as compared with known systems. Classification can be performed at high speed, giving increased classification performance, and update complexity is significantly reduced as compared with prior systems. In particular, incremental updates can be easily performed, for removal of a rule simply by deleting the corresponding rule vectors in the TCAM. Changes to the hierarchies and basic range IDs are not required for continued operation here. When a rule is added, this can be handled, if desired, simply by adding a dedicated additional level on top of the existing primitive range hierarchy in each relevant dimension such that the new level contains a single primitive range matching the new rule range in that dimension. The hierarchies can be otherwise be unamended, and the basic range IDs and ternary rule vectors updated accordingly. Of course, the classification data could also be fully reinitialized if desired here, but in general the classification data need only be reinitialized when desired to maximize process efficiency, for example at periodic intervals or after a set number of rule changes. Moreover, in general, the independent generation of the basic range IDs in each dimension, without reference to other dimensions, provides for a much faster update operation compared to prior systems.

An alternative packet classification system embodying the invention will now be described with reference to FIGS. 10 to 12. This system is employed for what is, in effect, a single search key lookup, where a particular operation to be performed for data packets is determined based on the value of a single item in the packet format. The particular embodiment below will be described in the context of routing lookups, where the next hop for packets in a network is determined based on the destination address field of the header. In particular, the appropriate next hops are defined in the system for various destination address prefixes. This single dimensional problem is treated here as a multidimensional packet classification problem, where the classification results (equivalent to the rules in the earlier systems) are next hop indicators, and the associated range of data values for which a given classification result applies is defined by the corresponding destination address prefix. A general overview of this system is given by the schematic of FIG. 10.

Figure 10:
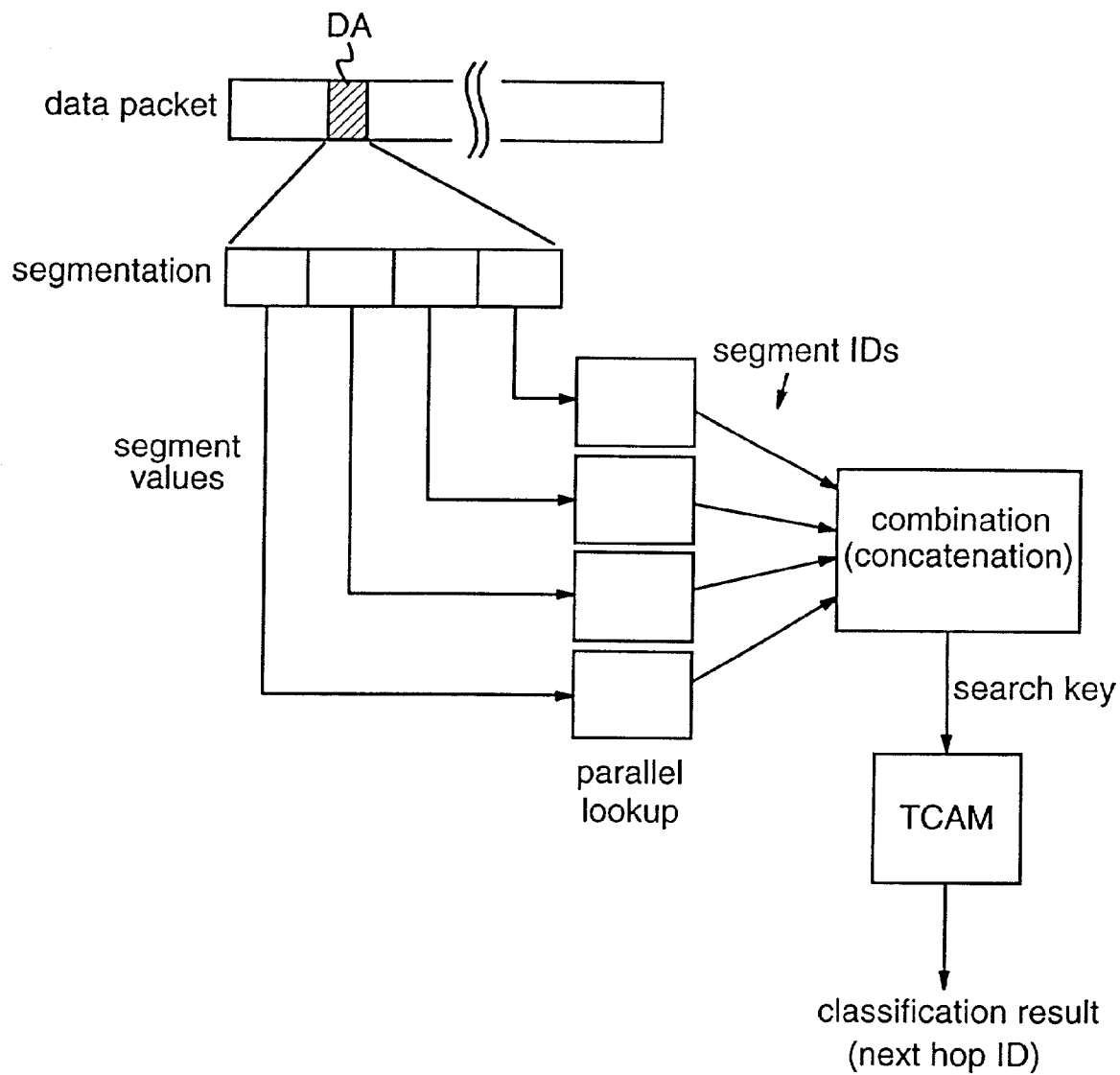
FIG. 10 gives a general overview of a second packet classification system embodying the invention.

In FIG. 10, the data item (here the destination address DA) to be evaluated is indicated by the shaded section of the data packet at the top of the figure. In a first step, the destination address is segmented into a plurality of segments of predetermined length. Four segments of equal length are shown here, though in general various numbers/lengths of segments can be employed as desired. The resulting segment values are then supplied as inputs for a parallel memory lookup operation where each segment value is mapped to a corresponding segment identifier. For each segment, the segment identifier here is selected from a predefined set of segment identifiers, associated with respective ranges of segment values, as that corresponding to the range containing the input segment value. The resulting segment identifiers, one for each segment, are then combined (in the present embodiment by simple concatenation) to produce a search key. This search key is supplied to a TCAM where it is compared with a set of ternary classification vectors. These classification vectors are each associated with a particular classification result (here a next hop ID), and are each derived in dependence on the segment identifiers for segment values contained in the range of data item values for that classification result, whereby a match between a classification vector and the search key indicates an applicable classification result. In the case of routing lookups however, where the appropriate next hop is generally indicated by the longest matching destination address prefix, the classification vectors are stored in the TCAM in order of decreasing length of the prefix corresponding to the associated next hop ID, whereby the next hop ID associated with the first matching vector in the TCAM is output as the classification result.

In this system therefore, the different segments of the destination address correspond to different dimensions of a multidimensional classification system, and the segment identifiers for each of these dimensions are accordingly allocated to sub-ranges within the range of possible values of each segment. This can be done in various ways, but extremely efficient results are achieved where the process is directly equivalent to that of the multidimensional embodiments above. In this preferred embodiment, therefore, for each next hop ID, the range of address values represented by the associated address prefix is used to derive a "classification range" for each dimension (i.e. one for each segment) which equates to the rule range in the multidimensional embodiments above. Each classification range covers the particular range of segment values which are contained in the corresponding segment of the overall address range represented by the prefix. A simple illustration of this is given in FIG. 11. Here it is assumed that only two dimensions are employed, i.e. that the destination address is segmented into two segments labeled X and Y in the figure. Three address prefixes, Prefix 1, 2 and 3, are represented schematically by the horizontal lines in the figure. The portion of Prefix 1 corresponding to segment X is labeled A, and that corresponding to segment Y is labeled B. Portion A is thus an exact value, whereas portion B corresponds to a range of segment values from B1 to B2 as indicated in the figure, where B1 signifies portion B plus all 0's up to the segment length (i.e. B000 . . . ), and B2 signifies B plus all 1's. For Prefix 1 therefore, the classification range for dimension (segment) X is a single value range (exact match), and the classification range for dimension Y is the value range B1 to B2. For Prefix 2, the entire prefix is represented by the portion C within segment X, so that Prefix 2 contains a range of X-segment values from C1 to C2 as indicated, where again C1=C000 . . . and C2=C111 . . . . The classification range for Prefix 2 in the X-dimension is thus the value range C1 to C2. In the Y-dimension, however, Prefix 2 contains all possible Y-segment values, so the classification range in this dimension is the entire segment value range. Similar consideration of Prefix 3 gives a single value classification range in the X-dimension (exact match for portion D), and a classification range in the Y-dimension from segment value E1 (E000 . . . ) to segment value E2 (E111 . . . ).

Figure 11:
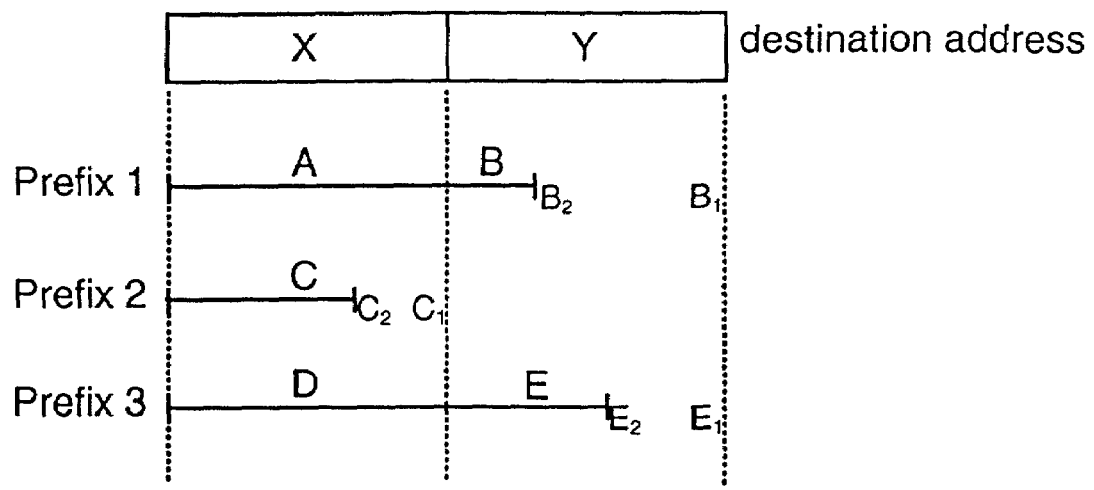
FIG. 11 illustrates a simple example of segmentation of address prefixes to derive classification ranges used in the FIG. 10 system.
Figure 12:
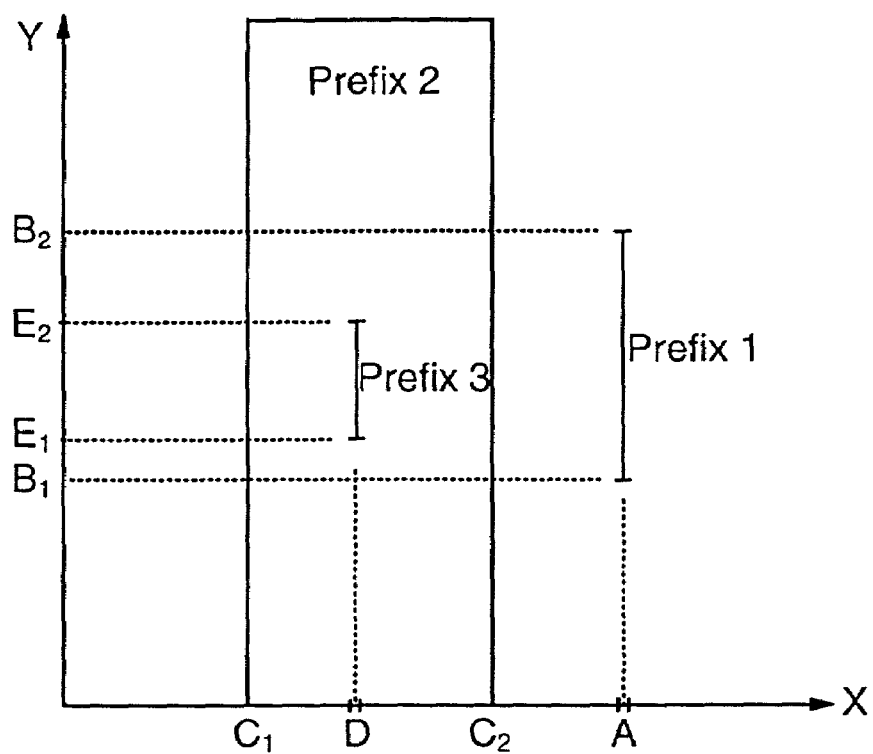
FIG. 12 shows a simple classification range diagram illustrating the principles of operation of the FIG. 10 system.

The classification ranges for the three prefixes of FIG. 11 can be represented in two-dimensional (X-Y) segment value space as shown in FIG. 12. Prefixes 1 and 3 are represented by vertical lines here since the classification ranges in the X-dimension are only a single value wide. Prefix 2 is represented by the shaded block since this prefix contains all segment values in the Y-dimension.

It will be appreciated that FIG. 12 shows a highly simplified example, and in practice there will typically be many hundreds of prefixes and the associated classification ranges may be distributed over multiple dimensions. However, it will be seen from this simple illustration that, based on the classification ranges derived as above, the remainder of the packet classification process can be performed in the same way as the true multidimensional embodiments described earlier, the classification ranges being equivalent to the rule ranges in the earlier embodiments, and the classification vectors being equivalent to the rule vectors in those embodiments. Thus, basic ranges are derived from the classification ranges in each dimension, primitive range hierarchies are defined, and basic range IDs for the basic ranges are derived from these hierarchies. In this regard, exact values (such as values A and D in the X dimension of FIG. 12) are treated like any other range but are simply of single-value width, resulting in primitive ranges one-value wide in the hierarchy. Also, where a classification range spans an entire dimension such as the Y-range for Prefix 2 in FIG. 12, this classification range can, if desired, be omitted from consideration in constructing the hierarchy, and a single subvector of all X's ("don't cares") used for the prefix in that dimension. In general, however, the classification vectors stored in the TCAM can be derived in exactly equivalent manner to the rule vectors in the earlier embodiments, and are thus dependent on the basic range IDs since they are derived here from the same hierarchies as the basic range IDs. (More specifically, the classification vectors for a classification result are dependent on the basic range IDs for those segment values in each dimension which are contained within the overall address range defined by the prefix for that classification result). The classification vectors are preferably stored in the TCAM in a priority order corresponding to prefix length as described above. In the present embodiment, however, the ID output by the TCAM indicates the next hop for forwarding of the data packet rather than an applicable rule.

Subject to the minor modifications discussed above relating to segmentation of data values and derivation of the classification ranges, the routing lookup operation (and similar single dimensional searches) can be performed by the data processing device 2 described earlier, and corresponding comments and advantages apply. Overall, therefore, a highly efficient system is provided for implementing single search key lookups as a multidimensional packet classification operation using a TCAM. Moreover, the system can be used for single data value lookups performed within a true multidimensional classification process. For example, the single data value lookup operations performed for $I_1$, $I_2$, etc. in FIG. 1 can be implemented using this process, resulting in a nested multidimensional system. It will of course be appreciated that the system affords even greater advantage as search keys in general increase in length. For IPv6 (Internet Protocol version 6) for example, it is anticipated that the address fields in the packet format will be 128 bits long. Embodiments of the invention can thus be applied to particular advantage for lookup operations in such systems.

While preferred embodiments have been described in detail above by way of example, it will be appreciated that many changes and modifications can be made to these embodiments without departing from the scope of the invention.

Having thus described our invention, what we claim as new, and desire to secure Letters Patent is:

1. A method for classifying a data packet in a data processing device to determine which of a plurality of predefined processing rules applies to the data packet, each said rule being associated with a range of possible data values in each of a plurality of dimensions corresponding to respective data items in the data packet, the method comprising:

(a) for each dimension, identifying the corresponding data value in the packet and determining which of a set of predefined basic ranges contains that data value, wherein the basic ranges correspond to respective non-overlapping value ranges between successive rule range boundaries in that dimension;

(b) for the basic range so determined for each dimension, selecting a corresponding basic range identifier from a set of predefined basic range identifiers corresponding to respective basic ranges in that dimension, wherein, for each of at least two dimensions, the basic range identifiers comprise respective $p_D$-bit strings generated independently for that dimension by (b1) defining a hierarchy of primitive ranges, which correspond to respective portions of the rule ranges between rule range boundaries in that dimension such that each rule range in the dimension is represented by one or more primitive ranges, wherein primitive ranges in the same level of the hierarchy are non-overlapping and each primitive range in a level above the lowest hierarchy level is a subset of a primitive range in the level below, (b2) assigning a primitive range identifier to each primitive range in the hierarchy such that primitive ranges in the lowest level have different identifiers and, in each higher level, any ranges which are subsets of the same range in the level below have different identifiers, and (b3) producing a unique $p_D$-bit basic range identifier for each basic range such that the $p_D$-bit identifier comprises a concatenation of the primitive range identifiers for the primitive ranges intersected by that basic range, the primitive range identifiers being concatenated in order of increasing hierarchy level;

(c) combining the basic range identifiers for said plurality of dimensions to produce a search key;

(d) supplying the search key to a ternary content-addressable memory; and (e) in the memory, comparing the search key with a set of prestored ternary rule vectors, each associated with a said rule and derived for that rule in dependence on the hierarchy for each of said at least two dimensions, to identify at least one rule which applies to the data packet.

2. A method according to claim 1 wherein, for each of said plurality of dimensions, the basic range identifiers comprise respective $P_D$-strings generated independently for that dimension by steps (b1) to (b3).

3. A method according to claim 1 wherein, in step (b3), each $P_D$-basic range identifier begins with said concatenation of primitive range identifiers, and, in step (c), the search key is produced by concatenating the basic range identifiers for said plurality of dimensions.

4. A method according to claim 3 wherein each ternary rule vector is generated from a concatenation of subvectors, corresponding to respective said dimensions, for the associated rule, where, for each of said at least two dimensions, for each rule a said subvector corresponding to each of the primitive ranges representing the rule range in that dimension is defined such that the subvector corresponding to a primitive range begins with a concatenation, in order of increasing hierarchy level, of the primitive range identifier of that range with the primitive range identifier of any lower-level primitive range of which that range is a subset, the resulting concatenation being made up to $P_D$-bits by bits of value X.

5. A method according to claim 4 wherein the set of rule vectors comprises, for each rule, a rule vector, comprising said concatenation of subvectors, for each possible combination of subvectors for that rule.

6. A method according to claim 4 wherein the set of rule vectors comprises, for each rule, a reduced set of rule vectors obtained by eliminating redundancy in the set of all possible combinations of subvectors for that rule in a concatenation of the subvectors corresponding to respective said dimensions.

7. A method according to claim 1 wherein the primitive range identifiers assigned in step (b2) are such that the identifiers assigned to primitive ranges in the lowest hierarchy level are prefix unique, and the identifiers assigned to any ranges which are subsets of the same range in the level below are prefix unique.

8. A method according to claim 1 wherein the primitive range identifiers assigned in step (b2) are such that primitive range identifiers in the same hierarchy level have the same number of bits.

9. A method according to claim 1 wherein a priority order is defined for said plurality of rules, and wherein step (e) includes selecting the highest priority rule which applies to the data packet.

10. A method according to claim 1, the method including, prior to performing step (a) for a first data packet:

generating said set of basic range identifiers for each of said plurality of dimensions; and deriving said set of ternary rule vectors in dependence on the hierarchy for each of said at least two dimensions, and storing the rule vectors in the ternary content-addressable memory.

11. Apparatus for classifying a data packet to determine which of a plurality of predefined processing rules applies to the data packet, each said rule being associated with a range of possible data values in each of a plurality of dimensions corresponding to respective data items in the data packet, the apparatus comprising:

a first memory storing, for each said dimension, a set of basic range identifiers corresponding to respective basic ranges in that dimension, wherein the basic ranges correspond to respective non-overlapping value ranges between successive rule range boundaries in that dimension, and for each of at least two dimensions, the basic range identifiers comprise respective $p_D$-bit strings generated independently for that dimension by defining a hierarchy of primitive ranges, which correspond to respective portions of the rule ranges between rule range boundaries in that dimension such that each rule range in the dimension is represented by one or more primitive ranges, wherein primitive ranges in the same level of the hierarchy are non-overlapping and each primitive range in a level above the lowest hierarchy level is a subset of a primitive range in the level below, assigning a primitive range identifier to each primitive range in the hierarchy such that primitive ranges in the lowest level have different identifiers and, in each higher level, any ranges which are subsets of the same range in the level below have different identifiers, and producing a unique $p_D$-bit basic range identifier for each basic range such that the $p_D$-bit identifier comprises a concatenation of the primitive range identifiers for the primitive ranges intersected by that basic range, the primitive range identifiers being concatenated in order of increasing hierarchy level;

a ternary content-addressable memory storing a set of ternary rule vectors, each associated with a said rule and derived for that rule in dependence on the hierarchy for each of said at least two dimensions; and control logic configured to identify the data value in the packet corresponding to each said dimension, to access the first memory to retrieve the basic range identifier corresponding to the basic range containing the data value so identified for each dimension, to combine the basic range identifiers for said plurality of dimensions to produce a search key, and to supply the search key to the ternary content-addressable memory for comparison with said ternary rule vectors to identify at least one rule which applies to the data packet.

12. Apparatus according to claim 11 wherein the control logic is further configured such that, prior to classifying a first data packet, the control logic generates said set of basic range identifiers for each of said plurality of dimensions and stores the basic range identifiers in the first memory, and derives said set of ternary rule vectors in dependence on the hierarchy for each of said at least two dimensions and stores the rule vectors in the ternary content-addressable memory.

13. A data processing device for connection as a node of a network system, the device comprising:

communications circuitry for communication of data packets between the device and other nodes of the network system; and packet classification apparatus according to claim 11, wherein the control logic is connected to said communications circuitry for receiving data packets to be classified therefrom.

14. A computer program product comprising a computer readable medium having embodied therein computer readable program code means for causing a processor of a data processing device to perform a method for classifying data packets to determine which of a plurality of predefined processing rules applies to each data packet, each said rule being associated with a range of possible data values in each of a plurality of dimensions corresponding to respective data items in the data packet, the method comprising:

(a) for each dimension, identifying the corresponding data value in the packet and determining which of a set of predefined basic ranges contains that data value, wherein the basic ranges correspond to respective non-overlapping value ranges between successive rule range boundaries in that dimension;

(b) for the basic range so determined for each dimension, selecting a corresponding basic range identifier from a set of predefined basic range identifiers corresponding to respective basic ranges in that dimension, wherein, for each of at least two dimensions, the basic range identifiers comprise respective $p_D$-bit strings generated independently for that dimension by (b1) defining a hierarchy of primitive ranges, which correspond to respective portions of the rule ranges between rule range boundaries in that dimension such that each rule range in the dimension is represented by one or more primitive ranges, wherein primitive ranges in the same level of the hierarchy are non-overlapping and each primitive range in a level above the lowest hierarchy level is a subset of a primitive range in the level below, (b2) assigning a primitive range identifier to each primitive range in the hierarchy such that primitive ranges in the lowest level have different identifiers and, in each higher level, any ranges which are subsets of the same range in the level below have different identifiers, and (b3) producing a unique $p_D$-bit basic range identifier for each basic range such that the $p_D$-bit identifier comprises a concatenation of the primitive range identifiers for the primitive ranges intersected by that basic range, the primitive range identifiers being concatenated in order of increasing hierarchy level;

(c) combining the basic range identifiers for said plurality of dimensions to produce a search key;

(d) supplying the search key to a ternary content-addressable memory;

(e) in the memory, comparing the search key with a set of prestored ternary rule vectors, each associated with a said rule and derived for that rule in dependence on the hierarchy for each of said at least two dimensions, to identify at least one rule which applies to the data packet; and (f) prior to performing step (a) for a first data packet, generating said set of basic range identifiers for each of said plurality of dimensions, deriving said set of ternary rule vectors in dependence on the hierarchy for each of said at least two dimensions, and storing the rule vectors in the ternary content-addressable memory.

15. A method for classifying data packets in a data processing device according to the values in respective data packets of a predetermined data item in the data packet format, a plurality of classification results being defined in the device for respective ranges of values of the data item, wherein the method comprises for each data packet:

(a) segmenting said predetermined data item into a plurality of segments of predetermined length;

(b) for each segment, selecting, in dependence on the value of that segment, a corresponding segment identifier from a predefined set of segment identifiers associated with respective ranges of segment values, the corresponding identifier being that associated with a range containing the value of said segment;

(c) combining the segment identifiers selected for said plurality of segments to produce a search key;

(d) supplying the search key to a ternary content-addressable memory; and (e) in the memory, comparing the search key with a set of prestored ternary classification vectors, each associated with a said classification result and derived for that classification result in dependence on the segment identifiers corresponding to segment values contained in the range of data item values for that classification result, to identify a classification result for the data packet, wherein:

for the range of data item values corresponding to each classification result, a classification range is defined in each of a plurality of dimensions corresponding to respective said segments of the data item, the classification range for each dimension corresponding to the range of values of the corresponding segment which are contained in the range of data item values for that classification result;

the set of segment identifiers utilized in step (b) for each segment is predefined for the dimension corresponding to that segment, the segment identifiers being associated with respective basic ranges in that dimension where the basic ranges correspond to respective non-overlapping segment-value ranges between successive classification range boundaries in that dimension; and for at least one said dimension, the segment identifiers comprise respective $p_D$-bit strings generated by (b1) defining a hierarchy of primitive ranges, which correspond to respective portions of the classification ranges between classification range boundaries in that dimension such that each classification range in the dimension is represented by one or more primitive ranges, wherein primitive ranges in the same level of the hierarchy are non-overlapping and each primitive range in a level above the lowest hierarchy level is a subset of a primitive range in the level below, (b2) assigning a primitive range identifier to each primitive range in the hierarchy such that primitive ranges in the lowest level have different identifiers and, in each higher level, any ranges which are subsets of the same range in the level below have different identifiers, and (b3) producing a unique $p_D$-bit segment identifier for each basic range such that the $P_D$-bit identifier comprises a concatenation of the primitive range identifiers for the primitive ranges intersected by that basic range, the primitive range identifiers being concatenated in order of increasing hierarchy level;

and wherein each said ternary classification vector is derived for the associated classification result in dependence on the hierarchy for said at least one dimension.

16. A method according to claim 15 wherein, for each of at least two said dimensions, the segment identifiers comprise respective $p_D$-bit strings generated independently for that dimension by steps (b1) to (b3).

17. A method according to claim 16 wherein, for each of said plurality of dimensions, the segment identifiers comprise respective $p_D$-bit strings generated independently for that dimension by steps (b1) to (b3).

18. A method according to claim 15 wherein, in step (b3), each $p_D$-bit segment identifier begins with said concatenation of primitive range identifiers, and, in step (c), the search key is produced by concatenating the segment identifiers for said plurality of segments.

19. A method according to claim 18 wherein each ternary classification vector is generated from a concatenation of subvectors, corresponding to respective said dimensions, for the associated classification result, where, for said at least one dimension, for each classification result a said subvector corresponding to each of the primitive ranges representing the classification range in that dimension is defined such that the subvector corresponding to a primitive range begins with a concatenation, in order of increasing hierarchy level, of the primitive range identifier of that range with the primitive range identifier of any lower-level primitive range of which that range is a subset, the resulting concatenation being made up to $p_D$-bits by bits of value X.

20. A method according to claim 19 wherein the set of classification vectors comprises, for each classification result, a classification vector, comprising said concatenation of subvectors, for each possible combination of subvectors for that classification result.

21. A method according to claim 19 wherein the set of classification vectors comprises, for each classification result, a reduced set of classification vectors obtained by eliminating redundancy in the set of all possible combinations of subvectors for that classification result in a concatenation of the subvectors corresponding to respective said dimensions.

22. A method according to claim 15 wherein the primitive range identifiers assigned in step (b2) are such that the identifiers assigned to primitive ranges in the lowest hierarchy level are prefix unique, and the identifiers assigned to any ranges which are subsets of the same range in the level below are prefix unique.

23. A method according to claim 15 wherein the primitive range identifiers assigned in step (b2) are such that primitive range identifiers in the same hierarchy level have the same number of bits.

24. A method according to claim 15, the method including, prior to performing step (a) for a first data packet:
generating said set of segment identifiers; and deriving said set of ternary classification vectors in
dependence on the segment identifiers and storing the classification vectors in the ternary content-addressable memory.

* * * * *